United States Patent [19]

Harasaki

[11] Patent Number: 4,466,653
[45] Date of Patent: Aug. 21, 1984

[54] AUTOMOBILE FRONT BODY STRUCTURE

[75] Inventor: Hayathugu Harasaki, Hiroshima, Japan

[73] Assignee: Toyo Kogyo Co., Ltd., Hiroshima, Japan

[21] Appl. No.: 419,577

[22] Filed: Sep. 17, 1982

[30] Foreign Application Priority Data

Sep. 18, 1981 [JP] Japan .................. 56-147161

[51] Int. Cl.³ ........................................ B62D 21/00
[52] U.S. Cl. ............................ 296/189; 296/191; 296/194; 296/203; 280/784
[58] Field of Search .............. 296/185, 9, 193, 4, 296/198, 202-204, 187, 8, 191; 280/784

[56] References Cited

U.S. PATENT DOCUMENTS

| | | | |
|---|---|---|---|
| 3,042,444 | 7/1962 | Porsche et al. | 296/191 |
| 3,638,748 | 2/1972 | Tixier | 280/784 X |
| 3,718,364 | 2/1973 | Fischer et al. | 280/784 X |
| 3,819,227 | 6/1974 | Casey et al. | 296/189 |
| 3,926,463 | 12/1975 | Landwehr et al. | 296/189 X |
| 4,194,763 | 3/1980 | Reidelbach et al. | 296/189 X |
| 4,428,599 | 1/1984 | Jahnle | 296/185 X |

FOREIGN PATENT DOCUMENTS 54-2490  2/1979  Japan .
54-59618  4/1979  Japan .

*Primary Examiner*—David A. Scherbel
*Assistant Examiner*—Russell D. Stormer
*Attorney, Agent, or Firm*—Fleit, Jacobson, Cohn & Price

[57] ABSTRACT

Automobile front body structure including a side beam of a closed cross-section extending forwardly at each side of the front engine compartment. The side beam has a bifurcated front end portion comprised of an upper and lower branched portions. A front cross beam of a closed cross-section connects the front end portions of the lower branched portions. A front bumper is supported by the upper branched portions of the side beams.

5 Claims, 9 Drawing Figures

AUTOMOBILE FRONT BODY STRUCTURE

The present invention relates to automobile body structures, and more particularly to front structures of automobile bodies.

Conventionally, automobile bodies include a front structure having a dash panel and a pair of side members extending longitudinally forwardly from the opposite sides of the dash panel. At the front ends, the side members are connected together by means of a transversely extending member which may be called as a lamp support or a cross member and a front bumper is mounted on such transverse member. In such a type of front body structure, efforts have been made to provide a satisfactory ability of absorbing shock loads in case of crash accidents. For example, Japanese utility model publication No. 54-2490 discloses an automobile front body structure in which the side members are connected together at rear upper portions thereof by a substantially horizontal panel member extending forwardly from the upper portion of the dash panel. In Japanese utility model application No. 52-133597 filed on Oct. 3, 1977 and disclosed for public inspection on Apr. 25, 1979 under the disclosure No. 54-59618, there is disclosed an automobile front body structure in which each of the side members has a longitudinal beam of a closed cross-section. The known structures are however disadvantageous in that the side members are apt to yield very easily so that the ability of absorbing shock load is suddenly lost and the longitudinal deformation of the structure is increased significantly under a shock load beyond a certain value.

It is therefore an object of the present invention to provide an automobile front body structure having an increased ability of shock load absorption.

Another object of the present invention is to provide an automobile front body structure which does not lose ability of shock load absorption even when the longitudinal deformation is increased under a car crash.

A further object of the present invention is to provide an automobile front body structure which can reduce the effect of crash load on the cabin of the automobile.

According to the present invention, the above and other objects can be accomplished by an automobile front body structure comprising a pair of side panels extending substantially longitudinally to form side walls of a front compartment, each of said side panels including a longitudinally extending side beam of a closed cross-section, said side beam having a main portion and a bifurcated front end portion including an upper branched portion and a lower branched portion, a front cross beam extending transversely and connected to the lower branched portions of the side beams in the side panels, a front bumper extending transversely and connected to the upper branched portions of the side beams. In the structure of the present invention described above, the upper branched portions at first receive crash loads through the front bumper in case of a car crash so that the upper branched portions are deformed or collapsed longitudinally to absorb shock loads. When the upper branched portions are collapsed longitudinally by a certain distance, the lower branched portions come into collision with obstacles so that crash loads are also applied to the lower branched portions to thereby have them collapsed longitudinally. Thus, the side beams can absorb the crash loads without showing abrupt decrease in the ability of shock load absorption.

In a preferable aspect of the present invention, the upper branched portions extend straight forward substantially horizontally from the main portions, whereas the lower branched portions are curved downwardly from the main portions and then extend forwardly. It is also preferable that the lower branched portion has a cross-sectional area which is greater than that of the upper branched portion. The side beam may preferably be connected at the rear end with a longitudinal beam of a closed cross-section which is formed in floor structure of the automobile body.

The above and other objects and features of the present invention will become apparent from the following descriptions of a preferred embodiment taking reference to the accompanying drawings, in which.

Figure 1:
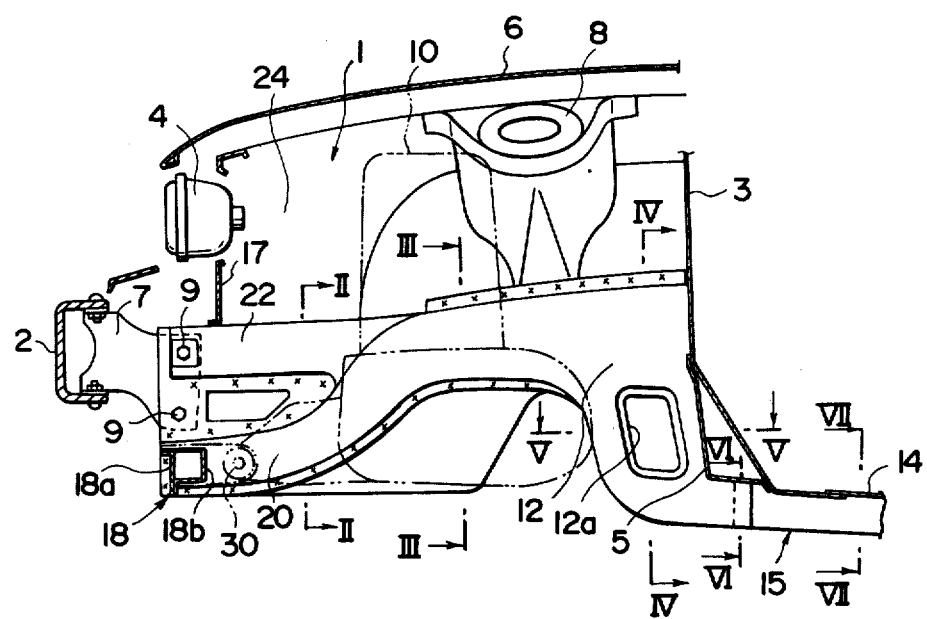
FIG. 1 is a sectional view of an automobile front body structure in accordance with one embodiment of the present invention.
Figure 6:
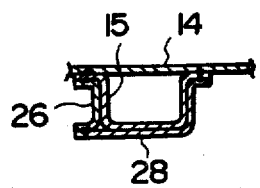
Figure 7:
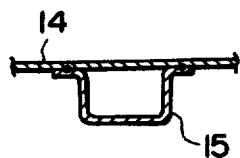
Figure 8:
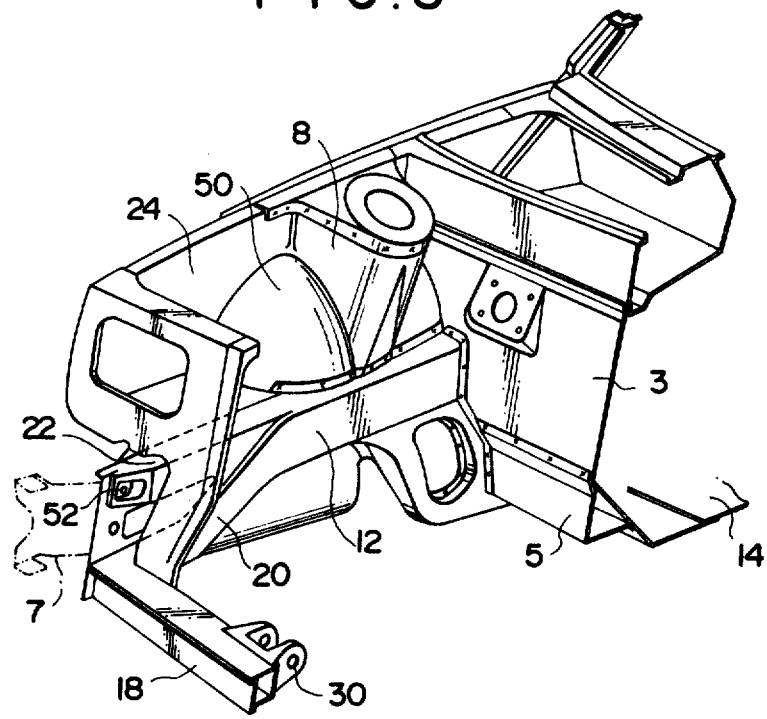
Figure 9:
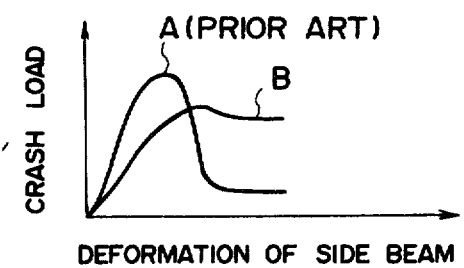

FIG. V is a sectional view taken substantially along the line V—V in FIG. 1;

FIG. 6 is a sectional view taken substantially along the line VI—VI in FIG. 1;

FIG. 7 is a sectional view taken substantially along the line VII—VII in FIG. 1;

FIG. 8 is a fragmentary perspective view of the front body structure; and,

FIG. 9 is a diagram showing the relationship between deformations in the front body structure and crash loads.

Referring now to the drawings, it will be noted that the automobile front body structure shown therein includes a dash panel 3 which extend transversely of the body to constitute a rear wall of a front compartment 1. The dash panel 3 is bent rearwardly at the lower end portion thereof and connected with a floor panel 14. At the bending corner of the dash panel 3, there is a dash reinforcement 5 which is welded to the dash panel 3 to form a transversely extending beam of closed cross-section. At each side of the dash panel 3, there is a side panel which is in the form of a wheel apron 24. The wheel apron 24 is welded at the rear end portion thereof to one side of the dash panel 3 and extend forwardly from the dash panel 3. The wheel aprong 24 is formed with a suspension tower 8 for receiving the upper end of a suspension strut and a wheel house 50 for providing a room for a front wheel (not shown).

Figure 5:
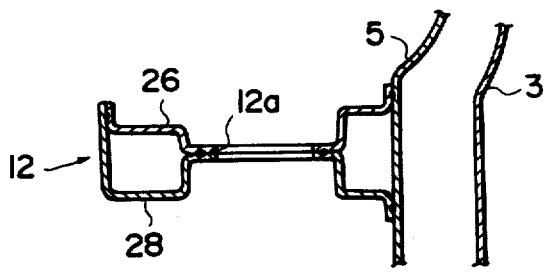

As shown in FIGS. 1 through 4, a side beam 12 is welded to the wheel apron 24 along its lower edge portion thereof. The side beam 12 includes a side beam outer 26 and a side beam inner 28 which are welded together to form a beam structure of closed cross-section. The side beam 12 is enlarged downwardly at the rear portion thereof and a lightening hole 12a is formed in the enlarged portion. As shown in FIGS. 5 and 8, the rear end of the side beam 12 is welded to the dash panel 3 and the dash panel reinforcement 5 and, at the lower rear end portion, the outer and inner members 26 and 28 of the side beam 12 are welded to a longitudinal floor reinforcement 15 which is in turn welded as shown in FIGS. 6 and 7 to the floor panel 14 to form a longitudinal beam of closed cross-section. Thus, a continuous beam structure of closed cross-section can be formed from the front side structure to the floor structure.

Figure 2:
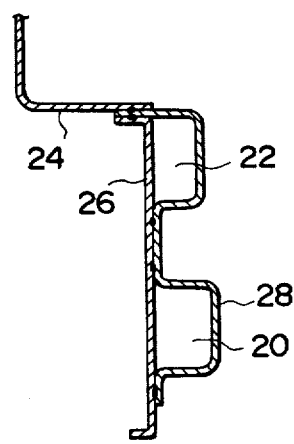
FIG. 2 is a sectional view taken substantially along the line II—II in FIG. 1.
Figure 3:
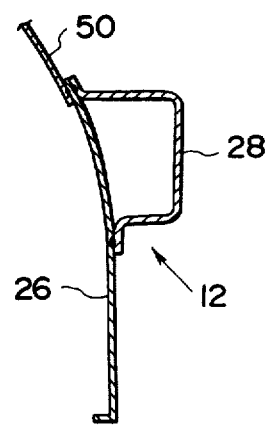
FIG. 3 is a sectional view taken substantially along the line III—III in FIG. 1.
Figure 4:
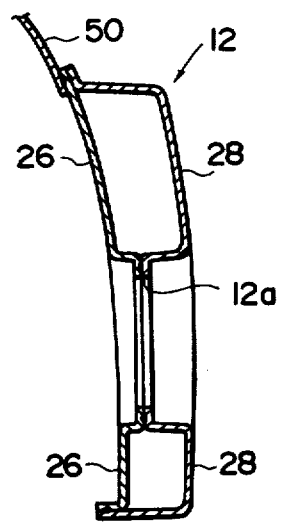
FIG. 4 is a sectional view taken substantially along the line IV—IV in FIG. 1.

The side beam 12 is bifurcated at its front end portion to form a lower branched portion 20 and an upper branched portion 22. In the illustrated embodiment, the upper branched portion 22 extends straight forwards substantially horizontally from the main portion of the side beam 12, whereas the lower branched portion 20 is curved downwardly and then extended forwardly. Further, as shown in FIG. 2, the lower branched portion 20 has a cross-sectional area greater than that of the upper branched portion 22. It will be noted in FIGS. 1 and 3, the outer member 26 of the side beam 12 is extended at the central portion thereof downwardly beyond the inner member 28 and has a curvature contiguous with the curvature of the wheel house 50 to form a part of the wheel house.

Between the front ends of the lower branch portions 20 of the side beams 12, there extends transversely a front cross beam 18 which comprises an outer member 18a and an inner member 18b welded together to form a beam structure of closed cross-section. The front cross beam 18 is welded at the opposite ends to the front ends of the lower branched portions of the side beams 12. As shown by phantom lines in FIG. 1, a power unit 10 comprised of an engine and a transmission is disposed in the compartment 1 and the front cross beam 18 is provided with a bracket 30 for supporting the power unit 10. The illustrated embodiment is of a front engine, front wheel drive type and the power unit 10 is positioned in the compartment with the engine crankshaft oriented transversely of the body.

At the front end portion of the upper branched portion 22 of each side beam 12, there is a bumper bracket 7 which is attached by bolts 9 to the side beam upper branched portion 22 and to the panel section of the side beam between the branched portions 20 and 22. A transversely extending front bumper 2 is carried by the bumper brackets 7. Further, a front panel 17 is provided to form a front wall of the compartment 1. In the front panel 17, there is mounted a head light 4 and a bonnet 6 is provided to cover the compartment 1.

In the structure described above, in case of car crash, shock load is at first imposed upon the upper branched portion 22 of the side beam 12 through the front bumper 2 so that collapsing deformation will be produced in the upper branched portions to absorb the crash shock loads. At this instance, the lower branched portions 20 and the main portions of the side beams 12 remain substantially undeformed so that deformations will not be transmitted to the dash panel 3. Further, since the power unit 10 is supported by the front cross beam 18 which is carried by the lower branched portions 20, the power unit 10 will not be displaced.

Where the crash load is large so that the upper branched portions 22 are not sufficient to absorb the crash load, the front cross beam 18 comes into collision with obstacles after the upper branched portions 22 have been deformed by certain distances. Thus, the lower branched portions 20 will be collapsed to absorb further shock loads. Thus, as shown by a curve B in FIG. 9, the structure can resist the crash shock load increasing the longitudinal deformations. Thus, the ability of shock load absorption can significantly be increased. In the structure of prior art, the resistance to the shock load decreases suddenly when the longitudinal deformation exceeds a certain amount as shown by a curve A in FIG. 9 so that the structure can no longer show the ability of shock load absorption. It should further be noted that in the illustrated structure, the lower branched portions 20 are curved downwardly and the power unit 10 is supported by the lower branched portions 20 through the front cross beam 18 so that the power unit 10 will fall downwards without being displaced rearwardly when deformations are produced in the lower branched portions 20 due to car crash. It will therefore be understood that the illustrated front body structure is effective to delay or decrease deformation of the dash panel in case of car crash.

The invention has thus been shown and described with reference to a specific embodiment, however, it should be noted that the invention is in no way limited to the details of the illustrated structures but changes and modifications may be made without departing from the scope of the appended claims.

I claim:

1. An automobile front body structure comprising a pair of side panels extending substantially longitudinally to form side walls of a front compartment, each of said side panels including a longitudinally extending side beam of a closed cross-section, said side beam having a main portion and a bifurcated front end portion including an upper branched portion and a lower branched portion, a front cross beam extending transversely and connected to the lower branched portions of the side beams in the side panels, a front bumper extending transversely and connected to the upper branched portions of the side beams whereby upon collision with an object, said upper branched portion will first be deformed to absorb the shock load of the collision and said lower branched portion will not be deformed until the deformation of said upper branched portion reaches a predetermined amount.

2. An automobile front body structure in accordance with claim 1 in which said upper branched portions extend straight forwards substantially horizontally from the main portions, whereas the lower branched portions are curved downwardly from the main portions and then extend forwardly.

3. An automobile front body structure in accordance with claim 2 in which said front cross beam is provided with means for supporting a power unit.

4. An automobile front body structure in accordance with claim 1 in which said lower branched portion has a cross-sectional area which is greater than that of the upper branched portion.

5. An automobile front body structure in accordance with claim 1 in which each of said side beams is connected at the rear end with a longitudinal beam of a closed cross-section which is formed in floor structure.

* * * * *